US008705341B2

(12) United States Patent
Robitaille et al.

(10) Patent No.: US 8,705,341 B2
(45) Date of Patent: *Apr. 22, 2014

(54) POWER OVER ETHERNET MANAGEMENT DEVICES AND CONNECTION BETWEEN ETHERNET DEVICES

(75) Inventors: Claude Robitaille, Quebec (CA); Patrick Ostiguy, Quebec (CA); Nicolas Cote, Quebec (CA); Steve Rochon, Quebec (CA); Dominique Bastien, Quebec (CA)

(73) Assignee: Accedian Networks Inc., St-Laurent, QC (CA)

( * ) Notice: Subject to any disclaimer, the term of this patent is extended or adjusted under 35 U.S.C. 154(b) by 150 days.

This patent is subject to a terminal disclaimer.

(21) Appl. No.: 12/962,849

(22) Filed: Dec. 8, 2010

(65) Prior Publication Data
US 2011/0080918 A1  Apr. 7, 2011

Related U.S. Application Data

(63) Continuation of application No. 11/411,596, filed on Apr. 25, 2006, now Pat. No. 7,873,057.

(60) Provisional application No. 60/674,684, filed on Apr. 26, 2005.

(51) Int. Cl.
*G06F 1/28* (2006.01)
*H04L 25/02* (2006.01)

(52) U.S. Cl.
USPC .................................. 370/216; 370/395.1

(58) Field of Classification Search
CPC .................................. G06F 1/28; H04L 25/02
USPC ......... 370/225, 226, 227, 228, 221, 217, 218, 370/241, 242, 250–252, 400, 389, 392, 370/395.1, 352, 356, 401

See application file for complete search history.

(56) References Cited

U.S. PATENT DOCUMENTS

| 6,535,983 | B1 | 3/2003 | McCormack et al. |
| 7,242,693 | B1 * | 7/2007 | Acharya et al. ............... 370/445 |
| 7,281,141 | B2 * | 10/2007 | Elkayam et al. .............. 713/300 |
| 7,310,664 | B1 | 12/2007 | Merchant et al. |
| 7,873,057 | B2 * | 1/2011 | Robitaille et al. ............ 370/401 |
| 2003/0115368 | A1 | 6/2003 | Wu |
| 2004/0078483 | A1 | 4/2004 | Simila et al. |
| 2004/0136713 | A1 | 7/2004 | Lim et al. |
| 2004/0164619 | A1 | 8/2004 | Parker et al. |
| 2004/0165595 | A1 | 8/2004 | Holmgren et al. |

(Continued)

FOREIGN PATENT DOCUMENTS

WO  WO 2004/104805  12/2004

*Primary Examiner* — Hanh N Nguyen
(74) *Attorney, Agent, or Firm* — Nixon Peabody LLP

(57) ABSTRACT

In one embodiment, a connection is maintained between a pair of ethernet ports that have circuitry connected in series with the ports and receiving power-over-ethernet (PoE) from one of the ports, by providing a controllable bypass circuit coupled to the pair of ethernet ports in parallel with the circuitry receiving power-over-ethernet, sensing a preselected condition, and opening and closing the bypass circuit in response to the presence or absence of the preselected condition. Power sourcing equipment (PSE) may supply the one of the ports with power over ethernet, and the circuitry may transports data between the pair of ethernet ports. The circuitry may also supply the switch with a control signal in response to the detection of the preselected condition.

7 Claims, 12 Drawing Sheets

(56) References Cited

U.S. PATENT DOCUMENTS

| | | |
|---|---|---|
| 2005/0078700 A1 | 4/2005 | Thompson et al. |
| 2005/0099949 A1 | 5/2005 | Mohan et al. |
| 2005/0099951 A1 | 5/2005 | Mohan et al. |
| 2005/0099952 A1 | 5/2005 | Mohan et al. |
| 2005/0144328 A1 | 6/2005 | McBeath |
| 2012/0218879 A1* | 8/2012 | Robitaille et al. ............ 370/216 |

* cited by examiner

Device with Fail over Bypass

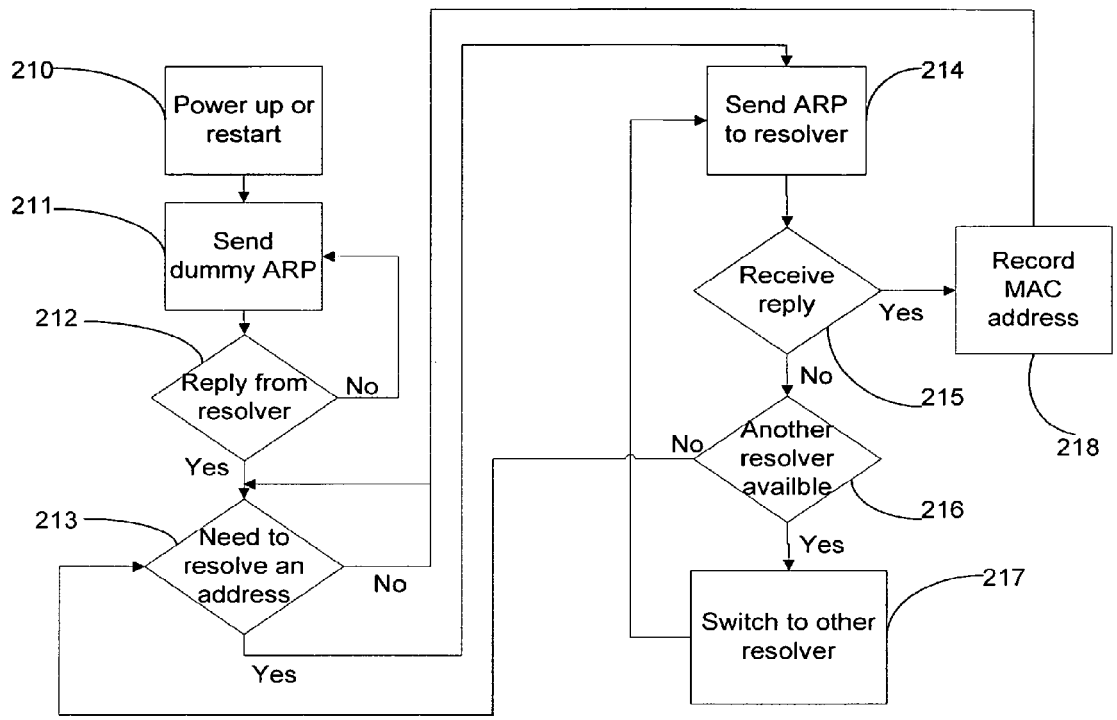
FIG. 19
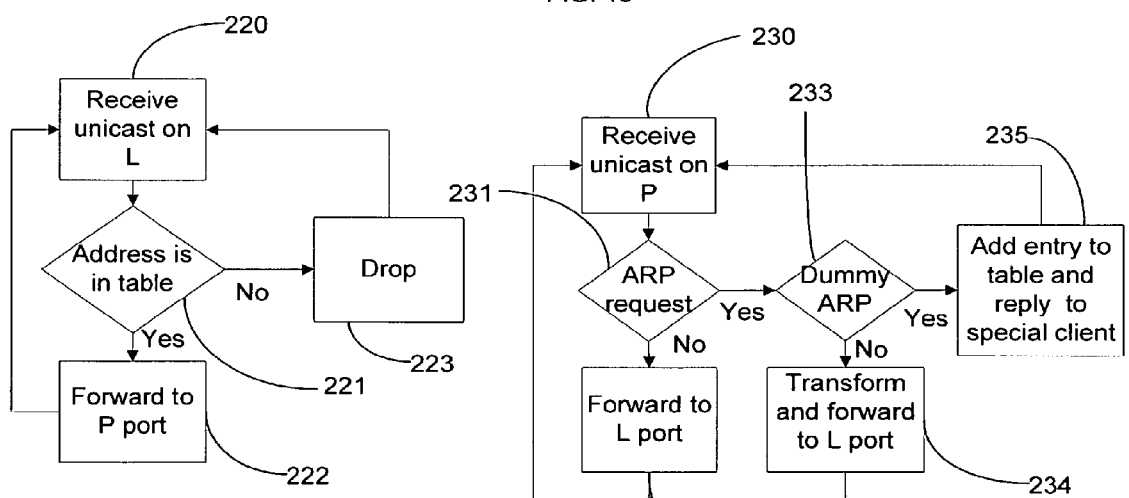
FIG. 20
FIG. 21

POWER OVER ETHERNET MANAGEMENT DEVICES AND CONNECTION BETWEEN ETHERNET DEVICES

CROSS REFERENCE TO RELATED APPLICATIONS

This application is a continuation of U.S. patent application Ser. No. 11/411,596, filed Apr. 25, 2006, which claims priority to U.S. Provisional Application No. 60/674,684, filed Apr. 25, 2005, both of which are incorporated herein by reference in their entireties.

FIELD OF THE INVENTION

This invention relates to Ethernet management devices used in the delivery of "paid for" Ethernet services by telecommunication carriers and operators, or by other organizations.

BACKGROUND OF THE INVENTION

The IEEE 802.3af standard defines a mechanism to deliver power to an Ethernet device via the Ethernet wire, known as "Power Over Ethernet" or PoE. FIG. 1 depicts a typical IEEE 802.3af setup in which power is delivered to a powered device ("PD") 10 (right side Ethernet device) from a power sourcing equipment ("PSE") 11 over a category 5 Ethernet cable 12. The power delivery may be using the data copper wire pairs (mode A) or the unused copper wire pairs (mode B). The left side Ethernet device 11 is not powered by PoE; it draws power from another source. It is the PSE device 11 that decides which wires to use (mode A or mode B). A typical mid-span is injector (where the PSE 11a is separate from the Ethernet device 11b) usually uses mode B, while a device that embeds a PSE typically uses mode A.

SUMMARY OF THE INVENTION

In one embodiment, a connection is maintained between a pair of ethernet ports that have circuitry connected in series with the ports and receiving power-over-ethernet (PoE) from one of the ports, by providing a controllable bypass circuit coupled to the pair of ethernet ports in parallel with the circuitry receiving power-over-ethernet, sensing a preselected condition, and opening and closing the bypass circuit in response to the presence or absence of the preselected condition. Power sourcing equipment (PSE) may supply the one of the ports with power over ethernet, and the circuitry may transports data between the pair of ethernet ports. The circuitry may also supply the switch with a control signal in response to the detection of the preselected condition. In one specific implementation, the switch comprises a pair of double-throw, double-pole relays having coils energized by power over ethernet, and two pairs of contacts for (a) opening the bypass circuit to couple the pair of ethernet ports via the circuitry and (b) connecting the ethernet ports to the circuitry, in response to energization of the relay coils, and for (a) closing the bypass circuit to couple the pair of ethernet ports directly and (b) disconnecting the circuitry from the ethernet ports, in response to de-energization of the relay coils.

In another embodiment, an ethernet link includes an ethernet management device that does not terminate the link, power sourcing equipment for supplying power over ethernet to the device, and a powered device, within the ethernet management device, receiving power over ethernet from the power sourcing equipment and powering the ethernet management device. The ethernet management device may be a repeater. The ethernet link may couple an operator's network and a customer's network, and the ethernet management device may provide a management function for the customer's network.

In another embodiment, an ethernet link includes first power sourcing equipment for supplying power over ethernet to at least one powered device, and a repeater or relay located between and coupled to the first power sourcing equipment and the powered device. The repeater or relay receives and supplies power over ethernet from the first power sourcing equipment via four pairs of conductors including both data signal conductor pairs and unused conductor pairs. The repeater or relay may include internal powered devices receiving power over ethernet from the first power sourcing equipment, and second power sourcing equipment supplying power over ethernet to the at least one powered device coupled to the repeater or relay. The internal powered devices may supply power to the second power sourcing equipment, which in turn may supply power over ethernet to the powered device or devices connected to the repeater or relay.

In another embodiment, a network device having at least first, second and third ethernet ports includes circuitry connected in series with the first and second, and with the first and third, ethernet ports and adapted to receive power-over-ethernet (PoE) from the first port via either two pairs of data signal wires or two pairs of unused wires; a bypass circuit coupled to the first and second ethernet ports, via the two pairs of unused wires, in parallel with the circuitry receiving power-over-ethernet from the first port; and a switch for closing the bypass circuit in response to the supplying of power to the circuitry via the data wires. A VOIP telephone may be coupled to the second port, and a LAN may be coupled to the third port.

In another embodiment, a pair of ethernet devices are coupled to each other through at least one repeater and adapted to communicate with each other using an administrative protocol that defines messages used to exchange information or commands. The repeater includes a controller programmed to communicate with at least one of the ethernet devices using the administrative protocol, including a MAC address for the repeater. The administrative protocol may be the OAM protocol defined by clause 57 of IEEE 802.3ah, modified to allow MAC-level addressing between an Ethernet device and a repeater, to carry OAM information.

In another embodiment, an ethernet includes a physical ethernet segment shared by at least two protected private networks coupled to a carrier network, a first special client coupled to the interface between the ethernet segment and one of the protected to private networks, a second special client coupled to the interface between the ethernet segment and the other of the protected private networks, and a network resolver between the ethernet segment and the carrier network. Each of the special clients and the resolver have a unique MAC address and is programmed to find the MAC address corresponding to an IP address, each of the special clients is programmed to send an ARP request to the network resolver using a unicast destination address, and the network resolver is programmed to respond to the request using a unicast ARP reply.

In another embodiment, a network device having a pair of ethernet ports includes circuitry connected in series with the ethernet ports for detecting incompatibility of ethernet devices coupled to the ethernet ports and correcting any detected incompatibility, a bypass circuit coupled to the pair of ethernet ports in parallel with the circuitry for coupling the ports, a sensing element responsive to a preselected condition, and a switch responsive to the sensing element for opening and closing the bypass circuit. The incompatibility may be detected by determining the link partner capability of the link partner at each of the ports, and then comparing the capabilities to detect any incompatibility.

BRIEF DESCRIPTION OF THE DRAWINGS

FIG. 19 is a flow chart of a routine executed by the special clients in the system of FIG. 18;

FIGS. 20-23 are flow charts of routines executed by the network resolver in the system of FIG. 18;

POE AND FAIL OVER BYPASS

Figure 1:
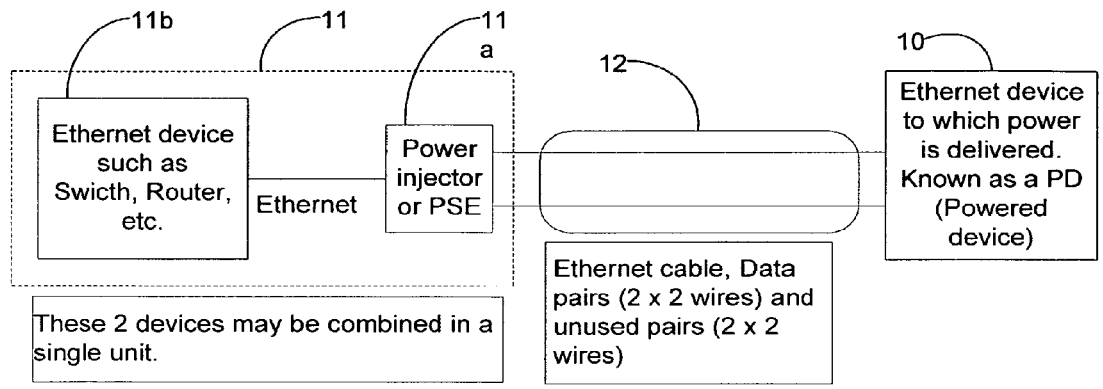
FIG. 1 is a diagram of a power over ethernet system of the type defined by the IEEE 802.3af standard.
Figure 2:
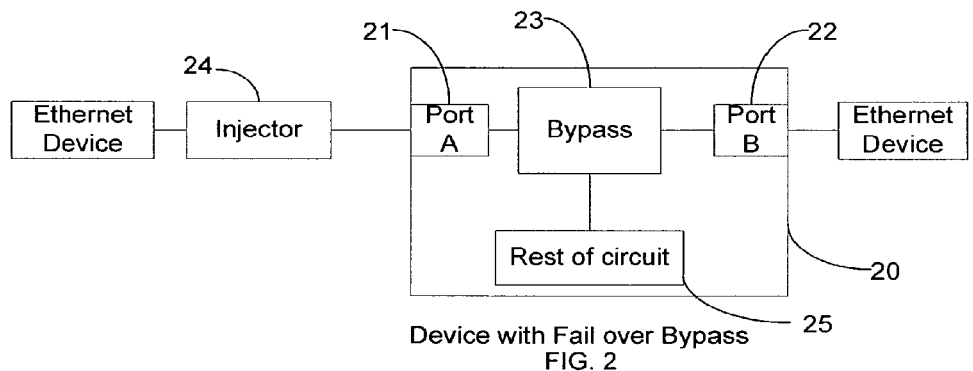
FIG. 2 is a block diagram of a device connected to a power over ethernet system and providing a fail over bypass.

One aspect of the invention, illustrated in FIG. 2, is to provide a device 20 having at least two Ethernet ports 21 and 22 with the capability of allowing the two ports to be electrically connected in the event of a failure (using an electrical bypass 23), including, but not limited to, a power loss, while keeping the capability of being powered by a PoE PSE 24 (once power comes back) using the IEEE 802.3af standard (PoE). Only one of the Ethernet ports 21 and 22 is a PoE client (called the PD).

Having a fail over bypass mode is particularly useful in situations where high availability of an Ethernet connection is important. The device's failure or power failure will not impair this high availability. But at the same time, being able to be powered even when in bypass mode is important for the device to resume its duty when the fault condition is corrected. A simple example is when the failure is a power outage; it would be desirable to re-power and restart the device when power is back.

All of the normal features of PoE, including detection and classification, should be supported and should not be affected in any way by any type of circuit on the non-PD port.

The device 20 is in normal operation when the bypass 23 is disabled and the two external Ethernet devices are connected to the Rest of Circuit 25. Power injected by the injector 24 feeds the device 20. In bypass mode, the Ethernet signal directly connects the two Ethernet devices, bypassing the Rest of Circuit 25, but the injector is still capable of powering the device 20.

Figure 3:
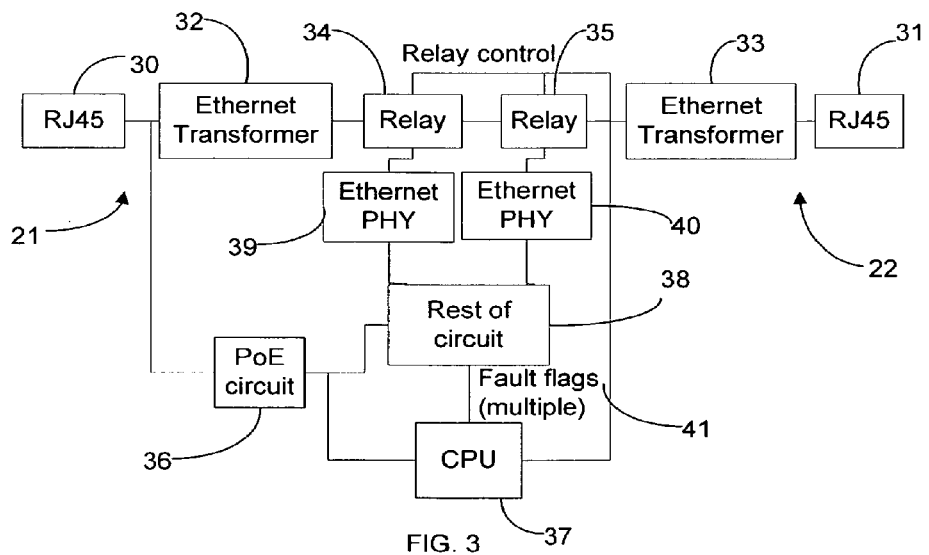
FIG. 3 is a block diagram of one implementation of the device illustrated in FIG. 2.
Figure 4:
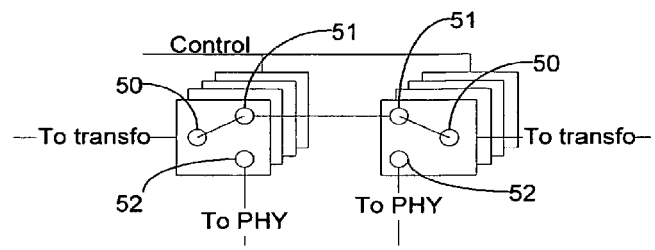
FIGS. 4 and 5 are diagrammatic illustrations of the relay circuit in the implementation of FIG. 3.
Figure 5:
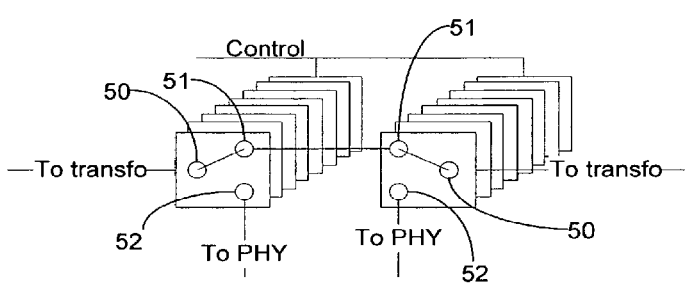

In an implementation of the device 20 illustrated in FIG. 3, the Ethernet signals are made of two differential pairs in the case of Ethernet and Fast Ethernet, or four differential pairs for Gigabit Ethernet, but are only shown, for simplicity, as a single wire. Each of the ports 21 and 22 includes an RJ45 socket 30 or 31 and an Ethernet transformer 32 or 33 connected to the common contact 50 of a relay 34 or 35. In fault mode, the relays 34 and 35 connect in pair (one pair per wire) together and the Ethernet signals pass from one RJ45 connector to the other via the Ethernet transformers 32 and 33 and the relays 34 and 35, using contact 51. In normal mode, the same signals will pass from one RJ45 connector to the Ethernet PHY 39 and 40 via the relays 34 and 35 by using contact 52. Power is blocked by the transformer 32 and is sent to a PoE circuit 36. A CPU 37 executes the flow chart of FIG. 6 described below. Signals supplied to the CPU 37 from the Rest of Circuit 38 on fault flag lines 39 represent the fault reporting statuses that are used by the CPU 37 to detect the failures and initiate a bypass mode of operation. These lines 39 may be actual electronic circuit(s) or may be statuses available to the software running on the CPU 37 by reading status registers or by other means. The number of such flags depends on the number of types faults that it is desired to monitor. CPU 37 supplies a control signal to the relays 34 and 35 via line 41. The Rest of Circuit 38 is connected to the relays 34 and 35 via parallel paths 39 and 40 in the physical layer (PHY) of the Ethernet.

The PoE 36 circuit is able to perform as a normal PD and feeds power the device 20, as per the IEEE 802.3af standard.

The Rest of Circuit 38 is made of all of the circuit an Ethernet device normally has and typically includes a CPU, memory, MAC circuit, etc. There is no special requirement for this circuit. The CPU 37 includes everything required to decide when to enable the bypass and when not to enable the bypass. Depending to the application, this circuit may support different failure modes for the decision process. In the most complete situation, the circuit may need a CPU 37, which may or may not be a CPU (if present) included in the Rest of Circuit 38, in order to perform the decision.

Figure 6:
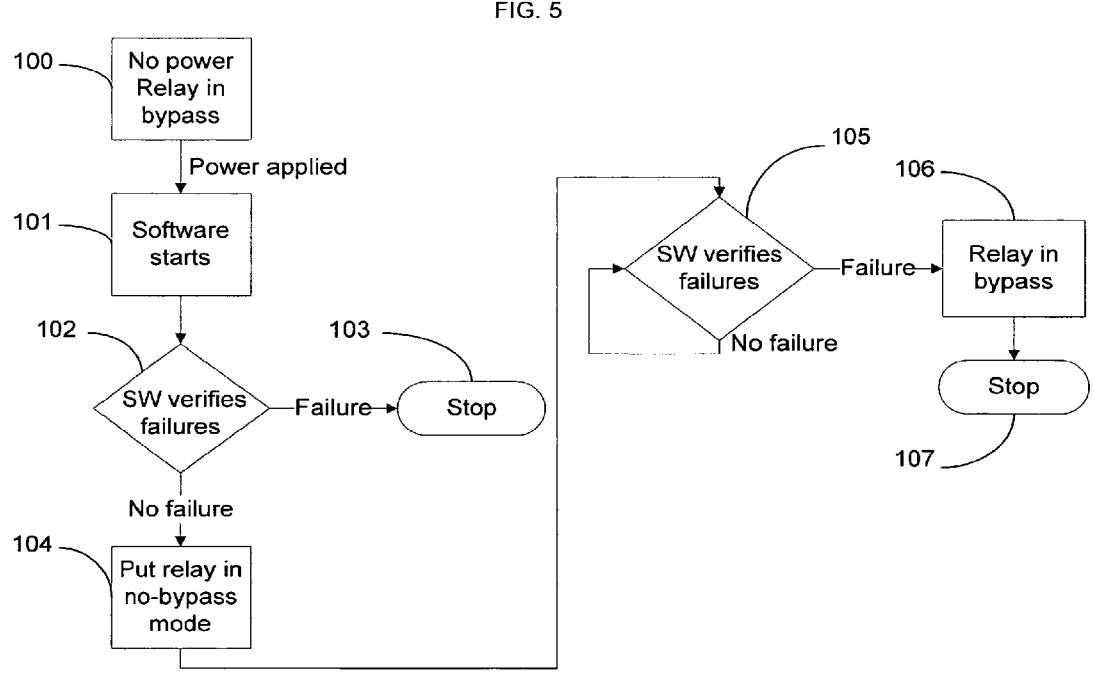
FIG. 6 is a flow chart of a routine executed by the CPU in the implementation of FIG. 3

Various failure modes may trigger the bypass mode. A non-exclusive list is:
 Total power failure
 Software not running
 Software detected PHY error or malfunction
 Software detected error or malfunction in various part of the rest of circuit, including, but not limited to:
  Memory error
  MAC error
  Partial power supply failure The CPU 37, controlling relays 34 and 35 via line 41 is designed so that in the absence of power, the relays position defaults to bypass mode. Once power is applied, the design also maintains the bypass mode until the software decides to turn off the bypass mode. The flow chart in FIG. 6 illustrates the routine executed by the CPU 37 and includes the following stages.

Stage 100: this is the un-powered state. The relays are in bypass mode.

Stage 101: power was applied to the device; the software starts its boot process; the relays remains in bypass mode.

Stage 102: the software verifies everything and checks for failure. The failures to may be detected by inspection of an hardware signal (for ex.: partial power failure), by a memory test, by a status reported in a register (for ex.: in a phy register) or by any other means that are deem to be valid failure indicators. If a failure is detected, the next stage will be 103, if not then the next stage is 104.

Stage 103: the software stops the boot process. The relays remains in bypass mode.

Stage 104: the software turns the relays in normal, none bypass mode.

Stage 105: software boot process is now completed; the software will continuously monitor everything and check for failure. If a failure is detected, the next stage will be 106.

Stage 106: the relays are put into bypass mode by the software.

Stage 107: everything stop, the device is in fail over mode with the relays in bypass mode.

PoE Powered Repeater or Relay Device

The IEEE 802.3af standard, defining the "Power Over Ethernet" (PoE) function, was created to power "terminal" devices, such as VoIP telephones, surveillance cameras and WiFI access points.

Figure 7:
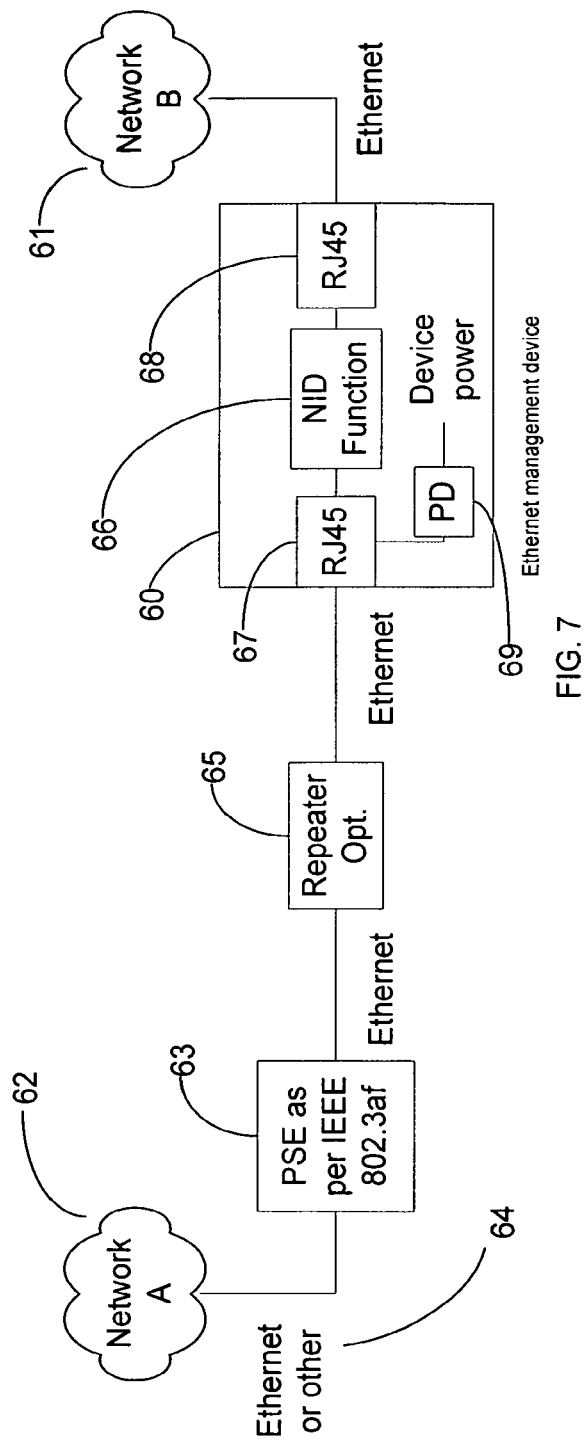
FIG. 7 is a block diagram of a managed ethernet service.
Figure 8:
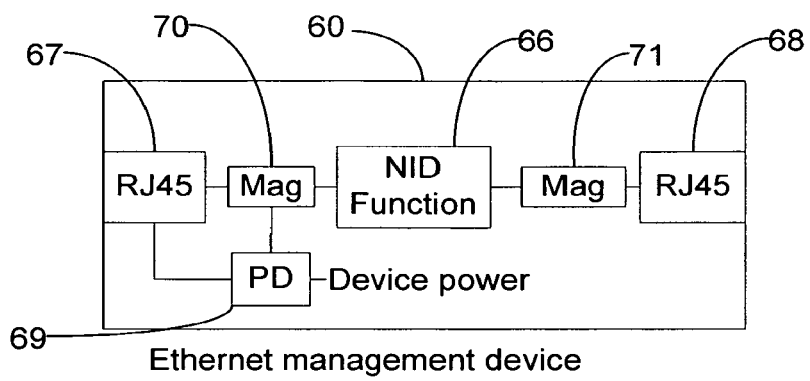
FIG. 8 is a block diagram of the ethernet management device in the system of FIG. 7.

The diagram in FIG. 7 depicts a typical managed Ethernet service. The Ethernet management device 60 is used to monitor, provision and administer the service at a point of demarcation, and does not terminate the Ethernet link. It is located near the point of need, i.e., near network 61. This is typically used by, but not limited to, a telecom operator's service offering. Large enterprises or campuses may also use the same model.

Network 62 represents the operator's network, which may have any arbitrary topology and technology. It represents a transport system. It is the primary network, where management systems are located. The power injector 63 may be a mid-span injector or an Ethernet device, such as a switch, router, transport gateway, etc. The network side 64 of the injector need not be Ethernet; any type of uplink is applicable. Network 61 represents the customer's network. An optional Ethernet repeater 65 may be present. However, in order to deliver power to the Ethernet management device 60, the repeater implements another aspect of this invention described below. It is the delivery of the Ethernet service to network 61 that is being managed.

The Ethernet management device 60 is a complete apparatus that includes a network interface device (NID) 66, two RJ45 ports 67 and 68, and a PD 69. The main function of the NID 66 is to relay network traffic between the two RJ45 ports 67 and 68, and is perceived by the network as a layer one device. The PD 69 delivers power to the device 60. Two RJ45 ports 67 and 68 represent the Ethernet ports and include Ethernet connectors.

IEEE802.3af is used to power the Ethernet management device 60 (and the inline repeaters 65, if any), which implements the functions of a fully compliant PD (Powered Device) 69.

The functions of the PD 69 may be implemented in the management device 60 by using a commercially available PoE circuit or by designing a discrete solution using standard components. The design of the management device 60 limits the power consumed by the complete unit to the limit set forth by IEEE 802.3af, i.e., 12.95 W. The power supply design, converting the −48V to the voltage(s) used by the device, must provide a galvanic isolation between the Ethernet cable's wire and the rest of the circuit of the device, including the metal casing (if any). Special attention must be paid to maintain the isolation between the two RJ45 ports 67 and 68 and their signals.

As required by the standard, IEEE 802.3af, the circuit must be capable of being powered by either the data signals or the unused signals.

By combining an IEEE 802.3af PD function 69 inside the management device 60, a more reliable service may be deployed. The delivery of the Ethernet service then becomes fully visible (by the management function of the device) at all times (by the fact that it is powered by the operator, using PoE) independently of the availability or reliability of power at the point of demarcation. Some of the benefits of creating and using this combination are:

Extend the reach of Ethernet by using line powered repeaters.

No dependency on customer provided UPS power (Uninterrupted Power Supply).

More reliable than AC power (injector may be battery backed-up and maintained by the operator) and therefore creates a more reliable service.

Better service availability (service is available and monitored even when no power is present).

No power-related false alarms (customer may accidentally remove the power of the management unit if power is locally fed), thus reducing operation costs associated to fault or alarm analyses.

Allows the operator/carrier to have full responsibility and accountability for powering the network devices up to the point of need (agreed demarcation point) and to sell this as a valued-added service to their customer, providing more revenue.

PoE in a Repeater or Relay with Power Carry Forward

The IEEE 802.3af standard adds powering capability to an Ethernet link. Power is added to the data signal wire pairs or to the unused wire pairs. An extension was made to the IEEE standard to allow adding power to both the data signal wire pairs and to the unused wire pairs at the same time, allowing more power to be delivered to the load. In such case, detection, classification and monitoring are performed independently for both power paths. The extension is called POE+ and is illustrated in FIG. 9.

Figure 9:
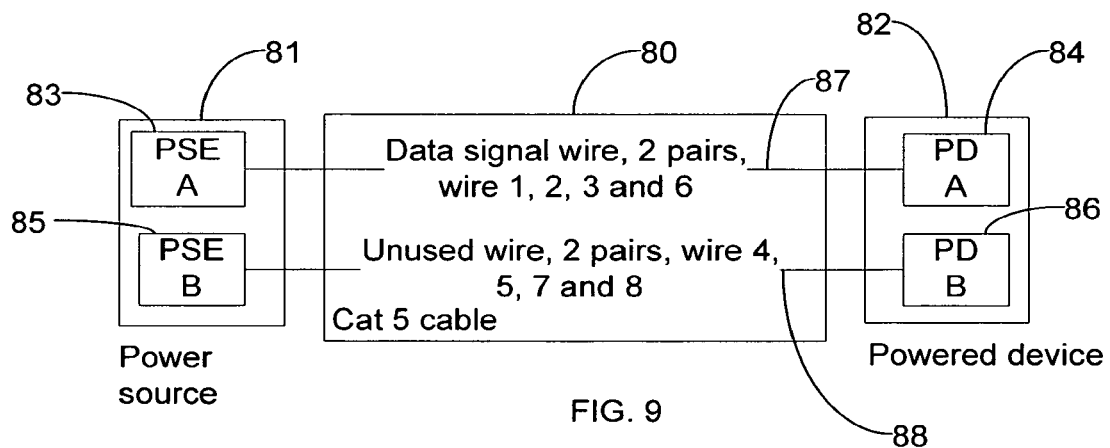
FIG. 9 is a diagrammatic illustration of the POE+ extension to the IEEE 802.3af standard.

Referring to FIG. 9, a power source 81 includes two items of power sourcing equipment (PSE) 83 and 85, and a unique logical load 82 includes two powered devices (PD) 84 and 86. The two PDs 84 and 86 are fully independent from the point of view of the power source 81, which is connected to the load 82 via a category 5 Ethernet cable 80, with data signal wires 1, 2, 3 and 6 connecting PSE 83 to PD 84, and unused wires 4, 5, 7 and 8 connecting PSE 85 to PD 86.

Figure 10:
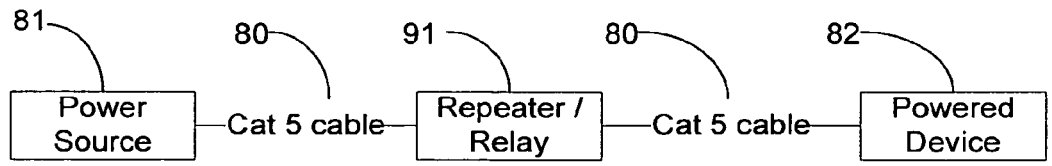
FIG. 10 is a diagram of a system having a repeater or relay located between the power source and the powered devices of FIG. 9.

In FIG. 10, an Ethernet repeater/relay 91 is located between the power source 81 and the load 82. The power handling circuit of the repeater/relay 91 is powered via the Ethernet cable 80, while still providing power to the terminating load 82. One of the functions of the repeater/relay 91 is to extend the reach between the two ends of the Ethernet link. Extending the reach of the DC power from the power source 81 to the load 82 means that there will be more power losses in the cabling plant. That loss and the fact that the repeater/relay 91 needs power requires that the power source be a POE+ source, i.e., provides power on all of the cat 5 cable 80 wire pairs, thus reducing the total cable loss. The PDs 84 and 86 in the load 82 are normal IEEE 802.3af devices, i.e., a device that draws power only on either the data signal wires or the unused wires but must be capable of being powered on either path.

Figure 11:
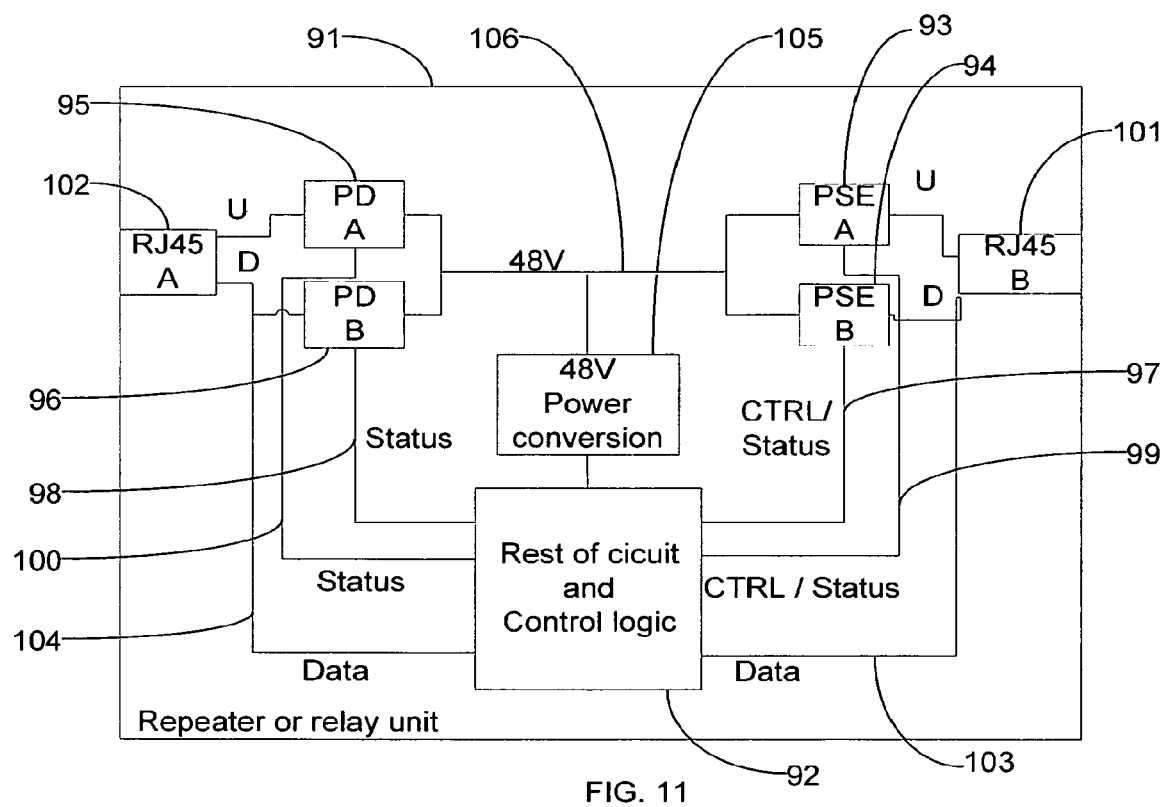
FIG. 11 is a block diagram of one implementation of the repeater/relay of FIG. 10.

FIG. 11 is a block diagram showing the high level modules that implement the to power handling function of the repeater/relay 91. The Rest of Circuit 92 includes the actual Ethernet repeater or relay function and the control circuit that operates the PSEs 93 and 94 based on statuses received from the two PDs 95 and 96 via lines 98 and 100 and from the PSE circuits 93 and 94 via lines 97 and 99. A first RJ45 102 connects to the power source 81, while a second RJ45 101 connects to the load 82. The two PDs 95 and 96 are normal IEEE 802.3af PD circuits with the exception that they are connected to only a single power path, i.e., either the two pairs of data signal wires or the two pairs of unused wires (normally, a PD must connect to both power paths and use only one at a given time). For example, the PD 95 may be connected to the unused wire pairs 88, while the PD 96 is connected to the data wire pairs 87. The data wire pairs 97 are also connected to the repeater or relay function via line 104. Similarly, the PSEs 93 and 95 are normal PSEs as per IEEE 802.3af. The PSE 93 is connected to the unused wire pairs 88, while the PSE 94 is connected to the data wire pairs 87. A 48V power converter 105 provides power to the local circuit 92.

Each of the two PDs 95 and 96 is designed such that it functions properly, i.e., presents the correct detection signature and classification signature, even when the other PD is fully delivering 48V. This specifically means that the presence of 48V 106 on the local side of the PDs 95 and 96 does not impact the normal behavior of the PDs, which therefore present the correct impedance during the detection and classification phases. The classification impedance is set to request maximum power from the power source. Also, the two PDs 95 and 96 are designed to provide a reliable status of presence or absence of power on their respective power paths using lines 98 and 100. The control circuit 92 waits for both power paths to deliver power before attempting to deliver power to the powered devices 82.

The PSE circuits 93 and 94 report to the control logic 92 the detection of a remote PD on their respective power paths, its classification, the MPS (Maintain Power Signature) and over current condition, using status lines 97 and 99. See IEEE 802.3af for details. The control circuit 92 is able to turn on and off each PSE circuit individually, using control lines 97 and 99.

Power may only be applied on a power path if a valid device is detected. To provide power beyond the normal 100 m specified by IEEE 802.3af and also provide power to the repeater/relay device 91, both power paths 87 and 88 are used, to minimize power loss, even if the powered devices 82 are regular IEEE 802.3af devices, unless the PD is classified as a low power device.

Figure 12:
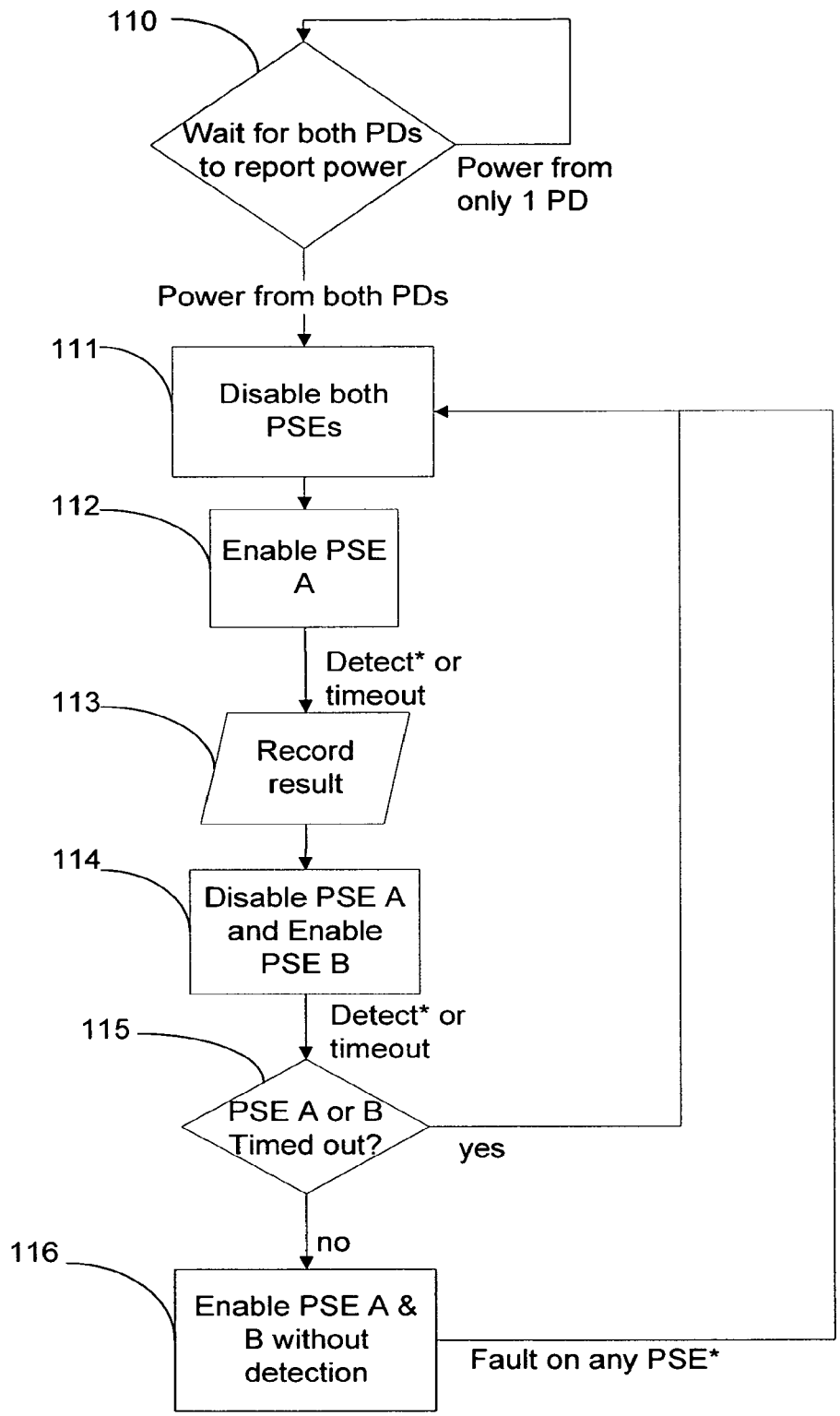
FIG. 12 is a flow chart of an algorithm executed by the implementation of FIG. 11.

The flow chart in FIG. 12 shows a powered device detection and classification algorithm for achieving the results described above. Since a legacy IEEE 802.3af PD only implements one detection and classification circuit, the repeater/relay 91 must alternatively perform the detection and classification on each power path, toggling between the two paths.

The algorithm illustrated in FIG. 12 only supports valid detection on both paths, but can be modified to only use one power path if the PD device 82 is a low power device. The illustrated algorithm includes the following stages:

Stage 110: The device waits for both power paths from the power source to be active.

Stage 111: Both PSE circuits are disabled and power is delivered to the external Powered Device.

Stage 112: PSE A is enabled. The circuit performs all the detection and classification operations as per the standard, but do not go into power delivering mode. The final result may be a timeout where no device is detected.

Stage 113: the result of the detection and the classification is recorded. A timeout indicates that no device is connected or that this specific power path is not handled by the device.

Stage 114: PSE A is disabled and PSE B is enabled. A delay of one second is inserted between the two events. The PSE B circuit performs all the detection and classification operations as per the standard but do not go into power delivering mode. The final result may be a timeout where no device is detected.

Stage 115: If either PSE A, as recorded in Stage 113 or PSE B timed out, as a result of stage 114, i.e., no device detected, the process is restarted from stage 111.

Stage 116: Both PSE circuits are set to unconditionally deliver power without detection or classification. The circuits monitor the MPS and over current conditions. If any invalid condition (no MPS or over current), both PSEs are turned of and the process restarts from stage 111.

The powered device may be a POE+ device, such as another repeater/relay in line).

PoE with Two Powered Devices (PDs)

There are cases where it is desirable to modify the standard PoE model that consists of a PSE powering a single PD over a physical cable link. Some situations require that two devices be powered. An example of such a situation is where a telecommunication operator is providing data services and telephony services on the same Ethernet link. It is desirable to provide power to a management device located in the customer's premises and also power a simple VoIP (Voice Over IP) device that provides life line support in case of a power failure. Life line support provides emergency call support even in the absence of local power; the equipment involved must therefore be powered from a reliable source.

Reliance on the customer to provide power to the devices located in the customer's premises is typically not reliable enough, even when battery backed up, to support life line needs. This limits the deployment of integrated services over Ethernet.

An embodiment of one aspect of the invention uses an operator-managed power source that implements an existing extension of the IEEE 802.3af standard. Such a source, or injector, provides power to both mode-A and mode-B power paths (mode A is where power is delivered over the Ethernet data wire pairs, while mode B is where power is delivered on unused wire pairs) and independently performs the device detection, classification and monitoring for both paths.

Figure 13:
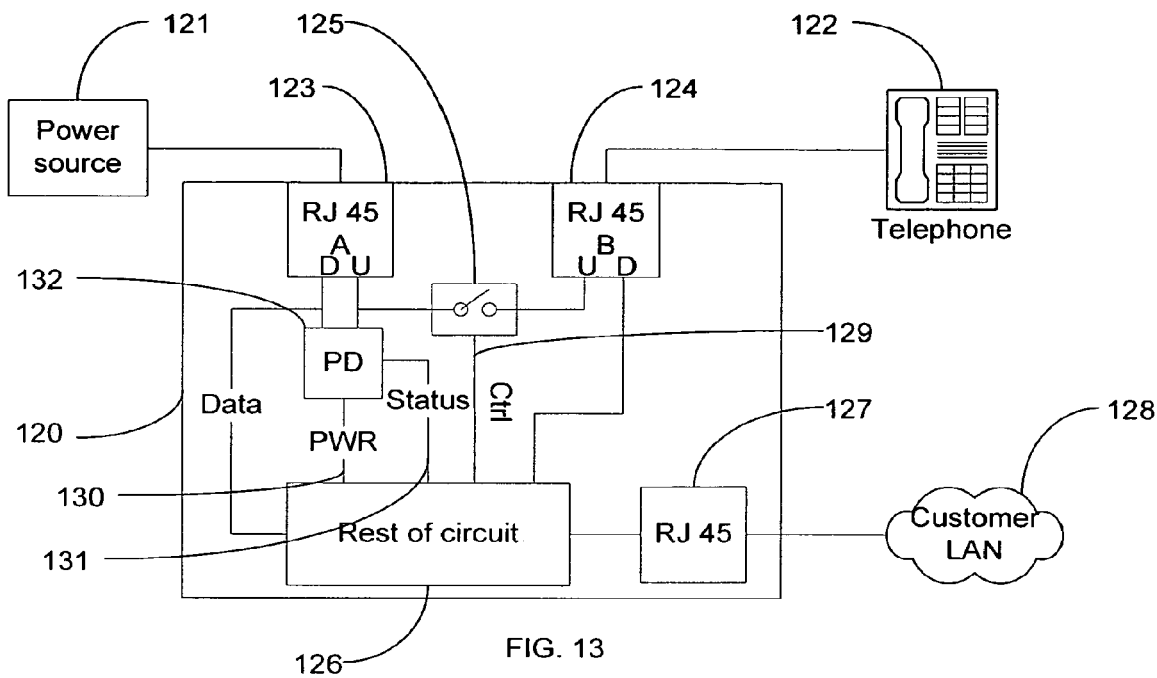
FIG. 13 is a block diagram of an ethernet management device that provides power to two devices at the same time.

The embodiment illustrated in FIG. 13 provides power to two devices at the same time by a method implemented inside a management device 120. Power is delivered to the management device 120 and to the VoIP device 122, each using its own dedicated power path from the same Ethernet cable. A power bypass 125 is provided between a pair of RJ45 connectors 123 and 124, and the management device 120 uses only the data wire pairs to draw power.

The power source 121 is part of the operator's Ethernet circuit, which is a classic Ethernet 10/100 BaseT or Gigabit Ethernet. FIG. 13 illustrates only the power function, not the data aspects of the circuit. The data wires from both RJ45 connectors 123 and 124 (pins 1, 2, 3 and 6, depicted by the letter D, corresponding to mode A in the standard) are connected to the Rest of Circuit 126. The data wires from the RJ45 connector 123 are also connected to a PD circuit 132, which behaves as a normal IEEE 802.3af-compliant circuit and also indicates to the "Rest or Circuit" 126 which power path is delivering power to the management device (path depicted by D or U from RJ45 A 123), using a status line 131. The PD circuit 132 delivers power to the management device 120, using a power line 130. The unused wires (pins 4, 5, 7 and 8, depicted by the letter U, corresponding to mode B in the standard) are connected the other RJ45 connector 124 via a switch 125, which is controlled by the Rest of Circuit 126 via control line 129. The third RJ45 connector 127 optionally provides data connectivity to a customer LAN 128, where the data service provided by the operator is delivered. There is no PoE function on this port.

The switch 125 connecting the two RJ45 connectors 123 and 124 includes four open/close interrupters suitable for Ethernet circuits and is controlled by the Rest of Circuit 126 using line 129. The four interrupters in the switch 125 are normally open when no power is applied.

The Rest of Circuit 126 performs its data management service and also controls the switch 125 connecting the U wires between the RJ45 connectors 123 and 124, and typically includes memory, CPU, Ethernet MAC and Ethernet PHY circuits. There is no special requirement except for the fact that it must detect the information reported by the PD circuit 132 and provide a control signal to the switch 125 via line 129.

In normal operation, the Rest of Circuit 126 obtains its power from the power source 121 via the data wire pairs (mode A). Power on the unused wires, flows between the two RJ45 connectors 123 and 124 and feeds power to the VoIP device 122. Both the Rest of Circuit 126 and VoIP device 122 implement the full detection, classification and current limiting functions as per IEEE 802.3af. The total cable length between the power source 121 and VoIP device 122 does not exceed the limit set by the standard (100 m).

Figure 14:
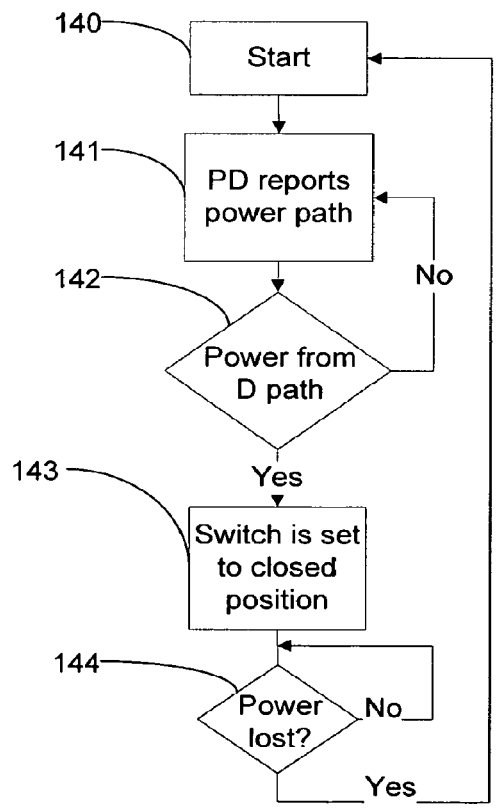
FIG. 14 is a flow chart of a routine executed by the device of FIG. 13.

The flow diagram in FIG. 14 depicts the operation of the Rest of Circuit 126, and includes the following stages:
 Stage 140: Power is applied to the management device. The switch is open by default.
 Stage 141: The PD circuit performs its function and reports which power path is being used to the Rest of Circuit.
 Stage 142: A decision is made to close the switch if power is being delivered via to the D wires.
 Stage 143: The switch is closed.
 Stage 144: This state of the switch remains closed until the power is removed, in which the process resumes at stage 140. The switch will then default to its open position.

802.3ah in a Repeater Scheme

The IEEE 802.3ah administrative protocol (OAM) is used between two Ethernet physical peers attached to the same wire link. The protocol defines messages that are used to exchange information or commands. It is assumed but not defined that the devices will communicate to the rest of world the information so gathered or will be remotely controlled to send commands (such as a loop back command). The communication method is also not defined; it could be inline with the Ethernet link or via another port.

At the link level, the OAM protocol does not need addressing; the traffic is always destined to the other link partner.

Figure 15:
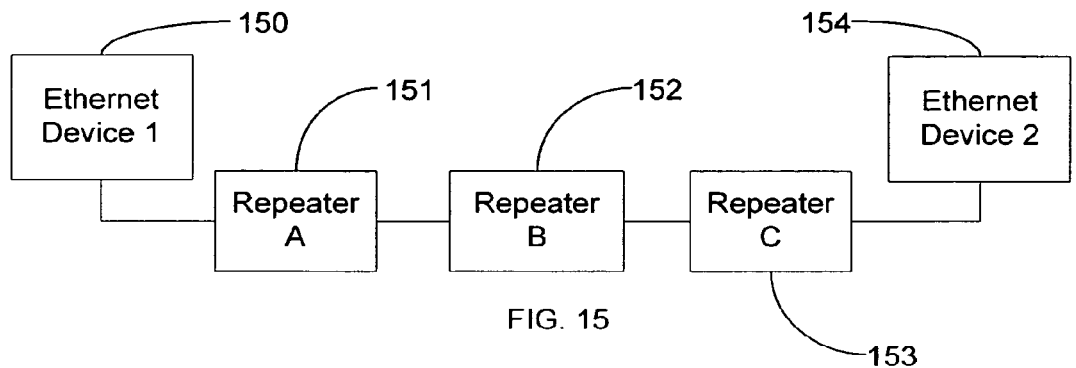
FIG. 15 is a diagrammatic illustration of two ethernet devices coupled through a series of repeaters.

In FIG. 15, two Ethernet devices 150 and 154 are coupled through a series of three repeaters 151, 152 and 153, which are simple devices that do not have communication capability to the rest of the world; they transparently repeat the traffic without intervention. It may be desirable to provide OAM capability on the link between two repeaters, but the OAM information is not accessible since it is not possible to talk to the repeaters. An example is the link between the repeaters 151 and 152 where the data collected using the OAM protocol by repeater 152 is not available due to the lack of a communication means. On the other hand, the Ethernet devices 150 and 154 are assumed to have communication capability to the rest of the world. They could be PCs, which have a user interface, or routers or switches, which are remotely managed, or other types of networking devices.

To circumvent the lack of direct communication with the repeaters 151, 152 and 153, one aspect of the invention provides an OAM link between each repeater 151, 152 and 153 and one or both of the Ethernet devices 150 and 154. This means that multiple streams of OAM traffic will exist on the Ethernet medium; and thus an addressing scheme is required.

In FIG. 15 only three repeaters 151, 152 and 153 are shown, but there is no limit to the number of repeaters that may be used. The repeaters 151, 152 and 153 have at least two ports but may have more. The term "repeater" as used herein includes relays.

The Ethernet devices 150 and 154 in FIG. 15 do not need to be physically or directly attached to the Ethernet medium. They may be located remotely with a variety of networking gear between them and the repeaters. The networking gear may be "dumb" devices, such as hubs, patch panels, etc., or may be complex transport devices and systems, such as ATM, SONET, etc.

To allow the Ethernet devices 150 and 154 of FIG. 15 to communicate with each of the repeaters 151, 152 and 153, the OAM protocol defined by clause 57 of IEEE 802.3ah is modified to allow MAC-level addressing between an Ethernet device and a repeater (to carry OAM information). A behavior of the repeater is also defined such that the repeaters are discovered in sequence, allowing the discovery of the topology. As an example, starting from the Ethernet device 150, repeater 151 may be discovered first, then repeater 152 and finally repeater 153. The repeaters do not have knowledge of the other repeaters; they only know about two potential OAM peers, which are the Ethernet devices 150 and 154.

The repeaters' behavior with regard to other Ethernet traffic is not altered; they repeat the traffic, as they would normally do. Also, legacy IEEE 802.3ah OAM traffic is not affected by the repeaters 151, 152 and 153, which allows a legacy OAM link to be established between the two Ethernet device 150 and 154.

The repeaters 151, 152 and 153 are made smarter by adding to them an OAM function, modified in the following ways:
 1. They have a MAC address.
 2. They are passive DTE as per IEEE 802.3ah specification. They implement multiple state machines, one for each port, which are fully independent.
 3. They generate OAM traffic compliant to the IEEE 802.3ah, clause 57, but using unicast MAC addresses (for both the source and destination address) instead of using the multicast address specified by the standard.
 4. The OAM traffic they generate uses their own MAC address in the source MAC address field.
 5. They accept OAM traffic that is addressed to their MAC address.
 6. They always repeat OAM traffic that is using the mandated multicast MAC to address.

7. They ignore OAM traffic that is using the mandated multicast MAC address.
8. For each state machine, they learn the MAC address of the Ethernet device (150 or 154) doing OAM by looking at packets that match the IEEE 802.3ah protocol type but where the source and destination MAC address are unicast MAC addresses and are equal. This Ethernet device (150 or 154) becomes the OAM link partner for the port associated to this state machine. This is the MAC address that their OAM traffic is using as the destination MAC address. This packet is used as a trigger to initiate the discovery process. They ignore further reception of this type of packet until their state machine is returned to the initial state.
9. They react to OAM packets that have unicast MAC addresses in both the source and destination MAC address fields by using the regular OAM procedure as described above using the ingress port as an egress port for the reply.
10. Independently for each direction, they block OAM traffic that is using unicast MAC addresses in the destination field until their discovery process, corresponding to the egress port, is complete, i.e., when local_pdu is set to ANY. This allows the Ethernet devices to discover the repeaters in sequence.
11. After local_pdu is set to ANY, they set local_satisfied to FALSE, Local Stable to 0 and Local Evaluating to 0 when a link down event is detected on any of their ports. The state machine is returned to the initial state. They do not use Local Stable set to 0 and Local Evaluating set to 0 otherwise. This is a fault propagation mechanism.

Figure 16:
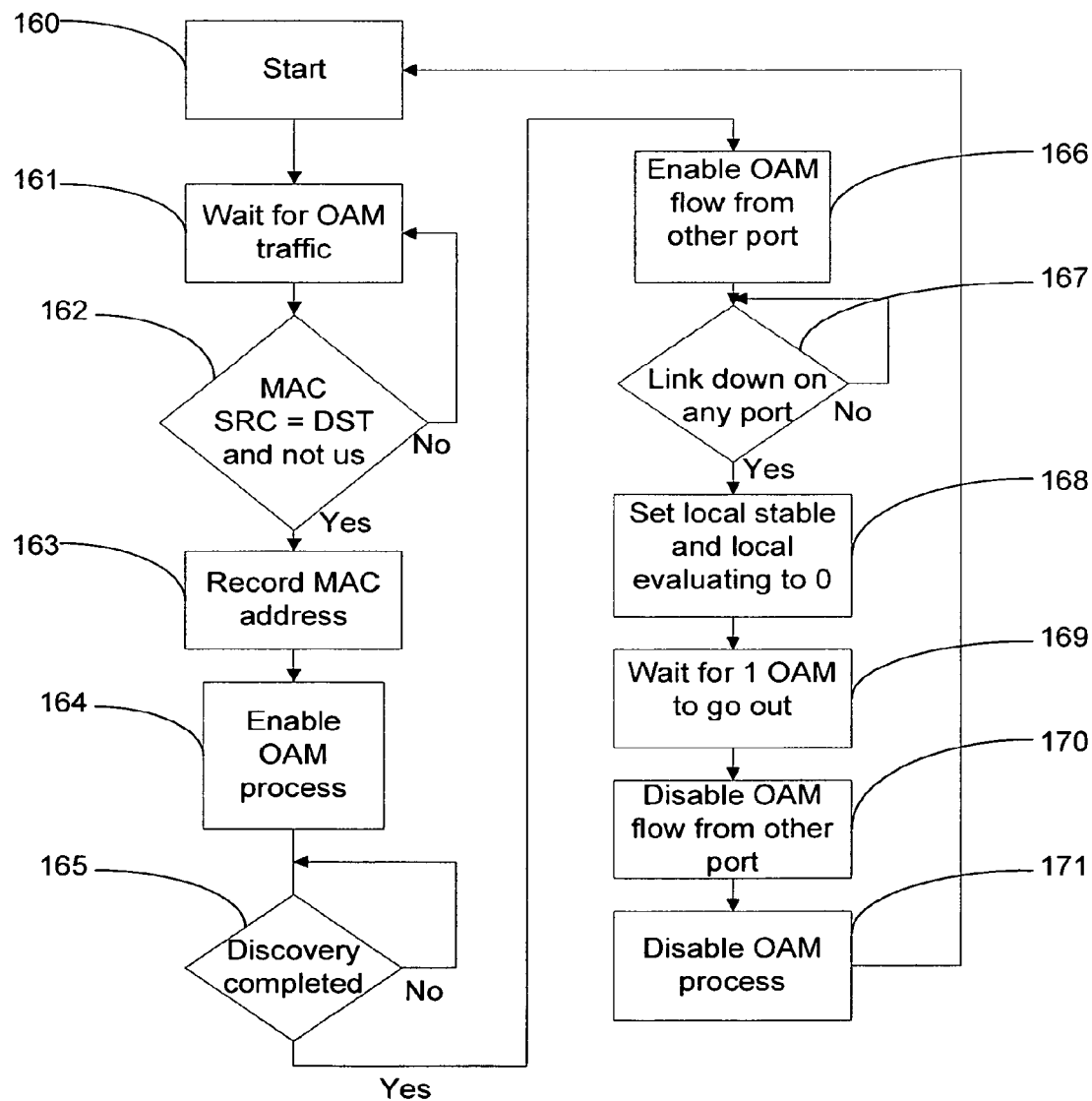
FIG. 16 is a flow chart of a routine executed by the repeaters of FIG. 15.

The flow chart of FIG. 16 illustrates the operation of the repeaters 151, 152 and 153 with regard to traffic that is unicast frames with the protocol type set to 88-09 (slow protocol, see IEEE 802.3ah, clause 57.4.2) and the subtype set to 0x03 (OAM, see IEEE 802.3ah, clause 57.4.2). All other traffic is not involved in this flow chart and is handled by the normal repeater function; this includes traffic with the protocol type set to 88-09, subtype 0x03, but that is using the mandated multicast MAC address. In the flow chart, OAM traffic means traffic that matches the description earlier in this paragraph. There is one instance of the flow chart per port. The flow chart of FIG. 16 includes the following stages:

Stage 160: This is the initial stage, after power up or after stage 171. In this stage, the flow of OAM traffic between the two ports is blocked, the recorded MAC address of the OAM peer is cleared and the OAM process is disabled.

Stage 161: The device waits to receive an OAM frame.

Stage 162: The device checks if the source MAC address and destination MAC address are the same and do not match the MAC address of the device. If all is true, then the next stage is 163; if not, the next stage is 161.

Stage 163: The MAC address from the received frame is recorded. This is the MAC address that will be used by the OAM process as the destination MAC address.

Stage 164: The OAM process is enabled. This OAM operates the same as a DTE as described in IEEE 802.ah except that it uses the recorded MAC address in stage 163 as the destination MAC address. Specifically, it initiates the Discovery process.

Stage 165: Discovery process completion is tested. The discovery is completed once local_pdu is set to ANY. When this occurs, the next stage is 166.

Stage 166: The forwarding of the OAM traffic received on the other port is enabled.

Stage 167: A check of link of both ports is performed. If any of the ports becomes down, the state machine will move to stage 168. While staying at this stage, OAM traffic received on the port covered by this state machine is processed by the OAM process. Forwarding of OAM traffic received on the other port is performed.

Stage 168: Local stable and local evaluating are set to 0.

Stage 169: The state machine waits for at least one OAM frame to be sent so that the peer receives the new local stable and local evaluating values.

Stage 170: The forwarding of the OAM traffic received on the other port is disabled.

Stage 171: The OAM process is disabled and all states and values used by the OAM process are reset to their default values. This is particularly true for the recorded MAC address for the OAM peer. The next stage is stage 160.

At lease one of the Ethernet devices 150 and 154 of FIG. 15 has a "modified mode," allowing communication and interaction with the repeaters 151, 152 and 153 and a legacy mode allowing interaction with a legacy Ethernet device. In order to allow interaction with the repeaters 151, 152 and 153, the OAM implementation in one or both of the Ethernet devices 150 and 154 is modified in the following ways:

1. They are active DTE as per the IEEE 802.3ah specification, except for the legacy mode where they can be active or passive as configured. Legacy mode may be enabled or disabled independently of the operations described herein.
2. They must implement multiple state machines, one for each discovered peer device (repeater or Ethernet device).
3. The OAM traffic they generate always uses their own MAC address in the source MAC address field.
4. They probe or discover devices on the link using the normal discovery OAM packet modified to use their own MAC address as a destination MAC address. The probe can be continuous, using any period, or can be stopped. The criteria for stopping the probing process are not specified.
5. They react using the normal information OAMPDUs (including discovery) when they receive a reply from a peer. A state machine for the newly discovered peer is created. It is assumed that the peer is compliant by the fact that the destination MAC address is the address of this Ethernet device. A reply that uses the mandated multicast address is assumed to be received from a legacy IEEE 802.3ah device. They learn the MAC address of the peer by looking at the source MAC address field.
6. They generate OAM traffic, other than the probes, using unicast MAC addresses in the destination MAC address field, except for the legacy IEEE 802.3ah traffic, where the mandated multicast address is used and which is limited to only one peer. The unicast address to use is the MAC address of the peer discovered during the discovery process.
7. They must clear all the state machines and start from the beginning when any of their peers report Local Stable set to 0 and Local Evaluating set to 0 or when the link goes down.
8. They shall not react to Loopback Control OAMPDUs if the OAM packet is received from a repeater that is using the modified OAM protocol.
9. They should implement one state machine using the unmodified OAM protocol to handle reply from a peer that is using the multicast MAC address (which indicates a legacy OAM device).

Figure 17:
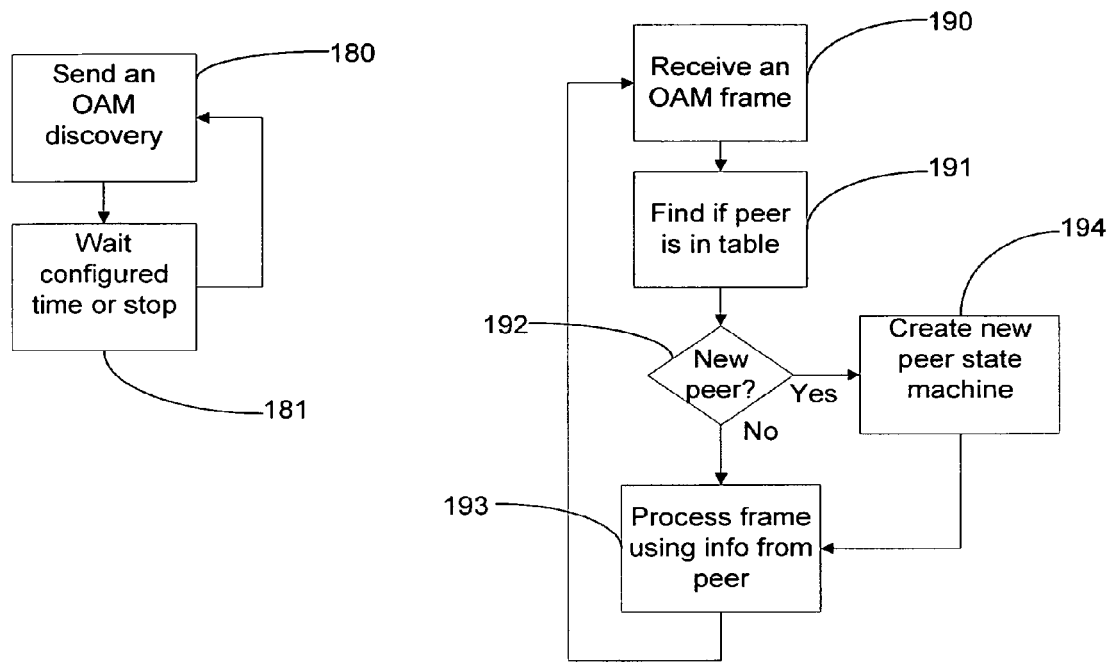
FIG. 17 is a pair of flow charts illustrating the operation of the ethernet devices of FIG. 15 with regard to a particular type of traffic.

The flow charts in FIG. 17 illustrate the operation of the Ethernet device(s) 150 or 154 with regard to traffic that is unicast frames with the protocol type set to 88-09 (slow protocol, see IEEE 802.3ah, clause 57.4.2) and the subtype set to 0x03 (OAM, see IEEE 802.3ah, clause 57.4.2). All other traffic is not involved in these flow charts and may be handled by the legacy OAM function, if it is OAM traffic; this will use standard, unmodified IEEE 802.3ah-compliant frames. Specifically, in these cases, the MAC address used in the destination address field shall be 01-80-c2-00-00-02. In the flow charts, OAM traffic means traffic that matches the description earlier in this paragraph. There is one instance of the flow charts and associated state machines per OAM peer comparable to repeater 151, 152 or 153 (other than another legacy OAM peer), except for the probe operation. The flow charts in FIG. 17 include the following stages:

Stage 180: This is the probe process. An OAM discovery frame is sent using the Ethernet device's MAC address as the destination MAC address.

Stage 181: The device waits for the configured period of time; after this time, if not other wise stopped, the probe process resumes to stage 180. If any OAM frame with local stable and local evaluating are set to 0 or if the link goes down, the probe process will resume to stage 180.

Stage 190: An OAM frame is received. As stated before, this is a unicast frame.

Stage 191: A search in a table of existing state machines is performed to match the source MAC address (MAC address of the peer).

Stage 192: If no existing peer is found in stage 2010, then the next stage will be stage 194: if not, it will be stage 193

Stage 193: Using the state machine and information related to the peer found in stage 191, the OAM frame is processed normally, as per the IEEE 802.3ah standard, except for the destination MAC address of the reply that will be the device's own MAC address. The next stage is stage 190.

Stage 194: A new state machine is created for the new peer. Its MAC address, to found in the source MAC address of the received OAM frame, is recorded.

IP Traffic Using Unicast Only on an Ethernet Network

Networks, such as Ethernet, are used to carry information, or traffic, between devices. Very often, the information is only destined to a single device while, on some occasions, it is required to send the information to multiple devices. In order to specify the destination, an address (MAC address) is used. This address may be unique (unicast) and belong to a single device, or it can be generic (multicast) and does not belong to a specific device. Transmitting devices use multicast addresses when sending to multiple recipients. The method by which the devices know which unicast address to use when transmitting some information to a specific destination is not part of the Ethernet specification; it is up to the networking protocols, such as IP, to provide the mechanism to find the correct address to use.

The IP protocol has its own addressing system. Each device has its own unique IP address. When carrying IP on an Ethernet network, the IP address must be resolved to a MAC address. This means that the transmitting device must use a mechanism to find the MAC address of the device that carries the IP address of the destination. The mechanism, known as the address resolution protocol (ARP), is defined by an IETF standard: RFC 826. This protocol uses a MAC level multicast to broadcast a request to resolve an IP address to all devices. The device that owns the IP address replies with its MAC address to the request originator. There is only one device with the specified IP address on a given network. Furthermore, if that IP address is used between networks, the same restriction applies between the networks; each device has a unique IP address. In public internetworking, such as the Internet, this means that the IP address scheme must be globally administered.

Figure 18:
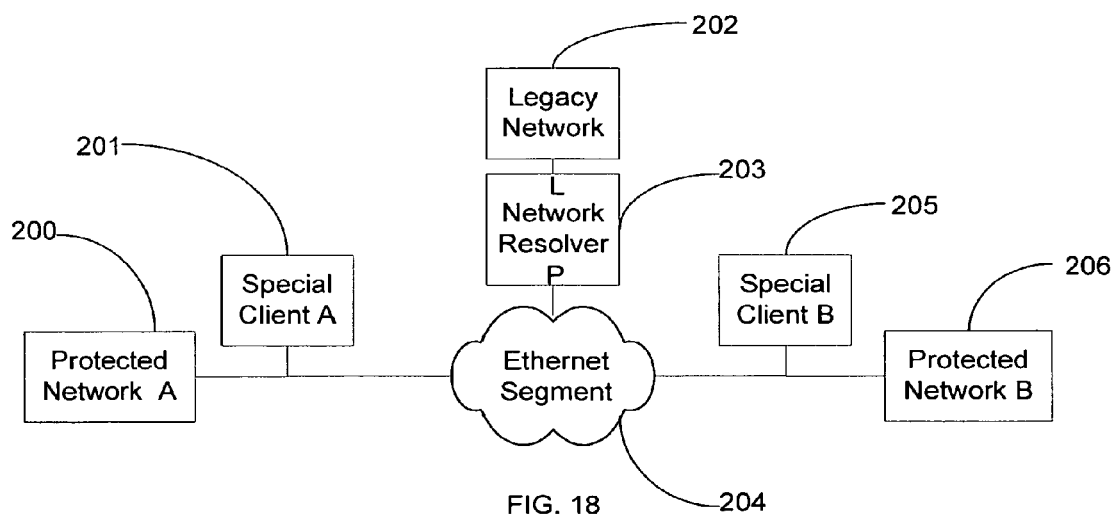
FIG. 18 is a diagrammatic illustration of two private networks sharing the same physical ethernet segment.

FIG. 18 illustrates a system in which two private networks 200 and 206 need to share the same physical Ethernet segment 204. This is the case when a carrier delivers an Ethernet service to a customer and needs to use IP traffic on the Ethernet segment to reach equipment located on the segment. If no cooperation exists in administering the IP addresses, an accidental conflict may occur. At least one of the networks must therefore implement some mechanism to prevent such conflicts from occurring. In FIG. 18, the protected networks 200 and 206 are free to use any IP addresses; they do not perform to any address conflict prevention with the legacy network 202 (but should make sure that there is no conflict within themselves, it is assumed that the protected networks 200 and 206 are centrally administered). Typically, the protected networks 200 and 206 belong to the carrier's customer and are connected by the service provided by the carrier. The legacy network 202 consists of devices that only implement the standards protocols and need to access at least one of the special clients 201 and 205 associated with the protected networks 200 and 206, respectively. The legacy network 202 will typically be located at the carrier's Network Operating Center (NOC). The protected networks 200 and 206 and the legacy network 202 are arbitrary; they can be composed of any type and any topology of Ethernet devices, including hosts, bridges and routers.

Mechanisms to avoid IP address conflicts are implemented in a network resolver 203 and in the special clients 201 and 205 The need for such mechanisms may be demonstrated by an operator/carrier that provides a private link between two sites of a customer. The customer's sites are represented by the protected networks 200 and 206, while the operator/carrier's operation, administration and maintenance system is represented by the legacy network 202. The special clients 201 and 205 are operator/carrier equipment used in the delivery of service to the customer. It is desired to use the IP protocol to access these devices but without consuming any network resources, such as VLAN, to isolate the special clients 201 and 205 from the customer's traffic (so as to eliminate IP address conflict).

The special clients 201 and 205 and the resolver 203 are allowed to resolve an IP address (find the corresponding MAC address) by modifying the ARP procedure defined by IETF RFC 826. The resolver 203 may be a software implementation inside an existing device or may be a dedicated hardware device that only provides this function.

Each of the special clients 201 and 205 and the network resolver 203 has a unique MAC address, which may be a static configuration or obtained by other means. This configuration, in addition to the normal IP settings, provides to the clients 201 and 205 the MAC address or addresses of the network resolver 203 or resolvers. There can be multiple network resolvers (for redundancy reasons), each with its own unique MAC address.

The network resolver 203 is a two-port device; one of the ports (labeled P) connects to the network to be protected via the Ethernet segment 204, while the other port (labeled L) connects to the network 202 of legacy devices. Unicast traffic may flow between the two ports, as in a bridge.

The special clients 201 and 205 and the network resolver 203 (on its P port) do not use multicast and/or broadcast IP packets. The special clients 201 and 205 resolve IP addresses (find the MAC address owning the requested IP address), if the address is not already known via an internal table, by sending a modified ARP request directed to the network resolver 203. Contrary to the regular ARP request, the client 201 or 205 uses a unicast destination address instead of the normal Ethernet broadcast address. This prevents other devices on the Ethernet segment 204 from receiving the request. The network resolver 203 responds to the client 201 or 205 requests using a unicast ARP reply. In case of a failure, detected by a timeout, the client 201 or 205 is allowed to try an alternate network resolver. The network resolver 203 processes the requests by using a regular ARP request on its L port.

The network resolver 203 blocks and intercepts all multicast and broadcast IP traffic, on either of its ports. It detects when an ARP request is destined to one of the special clients 201 or 205 and replies with the correct MAC address to the originator of the request. This is done without sending any traffic to the special client, by using an internally maintained table of MAC addresses.

Upon power up or reset, the special clients 201 and 205 send dummy ARP requests to the network resolver 203, using the IP address 0.0.0.0 or the IP address of the gateway, if one is configured in the client. They stop sending the requests once they have received a reply, but repeat it after a programmable inactive period or when their IP address is changed. The network resolver 203 uses this process to populate its address resolution table.

FIG. 19. is a flow chart of a routine executed by the special clients 201 and 205. This routine includes the following stages:

Stage 210: The special client starts from power up.
Stage 211: After initialization, the special client sends dummy ARP frames, directing them to the resolver. A copy is sent to all configured resolvers. The requested IP address is either 0.0.0.0 or the IP address of its configured gateway.
Stage 212: A reply from the resolver is received. If all resolvers respond, the routine proceeds to the next stage. If not, the routine returns to Stage 211, but only for the missing resolvers.
Stage 213: Wait for need to resolve an address. Stage 214: A modified ARP request is set to the current resolver. The format of the ARP is the same except that instead of a broadcast it is a unicast directed to the resolver.
Stage 215: A check is performed to detect the reception of a valid reply.
Stage 216: If no reply is received, the routine checks if another resolver is available.
Stage 217: A switch to the other resolver is performed. The next stage is 214 where an ARP request is sent to the new resolver.
Stage 218: A valid ARP reply is received. This is a standard ARP request, and the standard ARP reply processing is performed. This includes recording the information requested.

Figure 23:
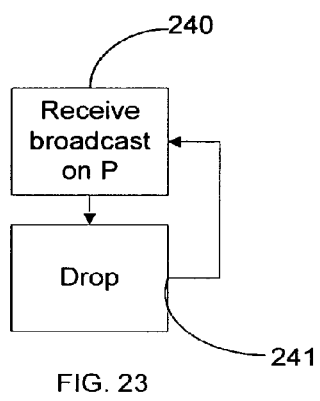
Figure 22:
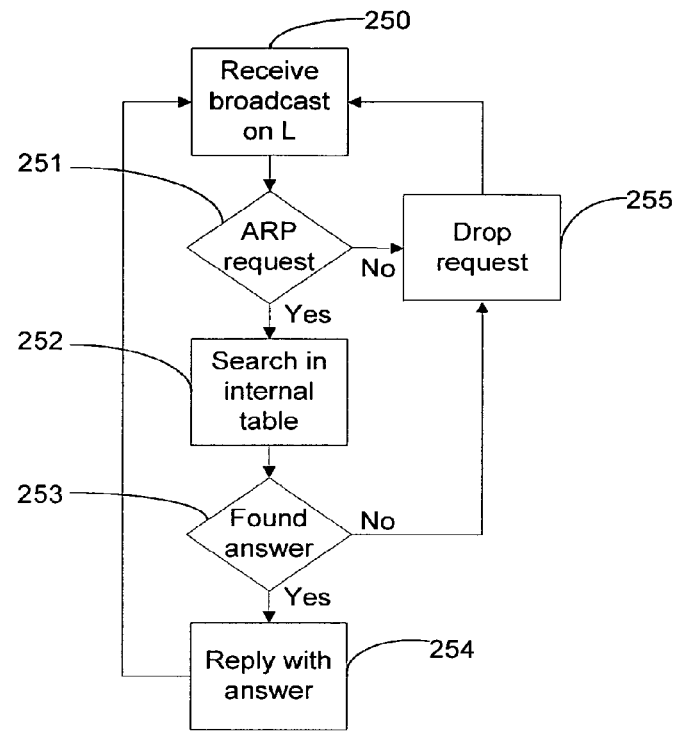

FIGS. 20-23 are flow charts of routines executed by the resolver 203. These flow charts include the following stages:

FIG. 20: Receiving a Unicast Frame on the Legacy Port.
Stage 220: A unicast frame is received on the legacy (L) port.
Stage 221: A check is performed to find if the destination MAC address matches an entry in an internal table.
Stage 222: An entry is found; the frame is forwarded to the Protected (P) port.
Stage 223: No entry is found; the frame is discarded.
FIG. 21: Receiving a Unicast on the Protected Port.
Stage 230: A unicast frame is received on the Protected (P) port.
Stage 231: A check if performed to detect if the frame is an ARP request.
Stage 232: If the frame is not an ARP, it is forwarded to the legacy port (L).
Stage 233: A check is performed to detect if the frame is a dummy ARP from a special client.
Stage 234: The frame is an ARP request from a special client 201 or 205; it is modified to make it a standard ARP request and forwarded to the legacy port.
Stage 235: The frame is a dummy ARP request; an entry corresponding to the special client 201 or 205 is created if none exists, or it is updated if an entry already exists. The special client 201 or 205 MAC and IP addresses are recorded. A reply is sent to the special client, using the MAC address of the resolver in the response.
FIG. 22: Receiving a Broadcast on the Legacy Port.
Stage 250: A broadcast frame is received on the legacy port.
Stage 251: A check is performed to find if the frame is an ARP request.
Stage 252: The frame is an ARP request; a search in an internal table is performed to find a matching entry for the destination IP address requested.
Stage 253: A matching entry is found if the IP address of the request matches the IP address of a special client 201 or 205.
Stage 254: A standard ARP reply is created, using the information of the matching special client, and sent to the requestor on the legacy port.
Stage 255: The frame is dropped.
FIG. 23: Receiving a Broadcast on the Protected Port.
Stage 240: A broadcast frame is received on the Protected port.
Stage 241: The frame is unconditionally dropped.

Automatic MDI/MDIX Selection Support with Fail Over Bypass

The Ethernet physical layer (IEEE 802.3, clause 14) defines the connection between two Ethernet devices using twisted pair cabling. To properly connect, each device must connect its transmitter to the other device's receiver and vice-versa. In order to do this, the standard defines a connector pinout (clause 14.5.1, this pinout is called MDI) and a crossover function (clause 14.5.2) that connects each device's TX pins to the other device's RX pins. The crossover function may be implemented in the cabling or in one of the devices, which changes the TX and RX pin definitions. In the latter case, the pinout is called MDIX. Also, a device may implement an automatic MDI/MDIX crossover function (IEEE 802.3 clause 40.4.4) that is used to detect the proper type of pinout (MDI or MDIX) required in order to establish an Ethernet link. Without a crossover function in the cabling, one of the devices must implement, or operate as, an MDI pinout while the other must be using MDIX.

Figure 24:
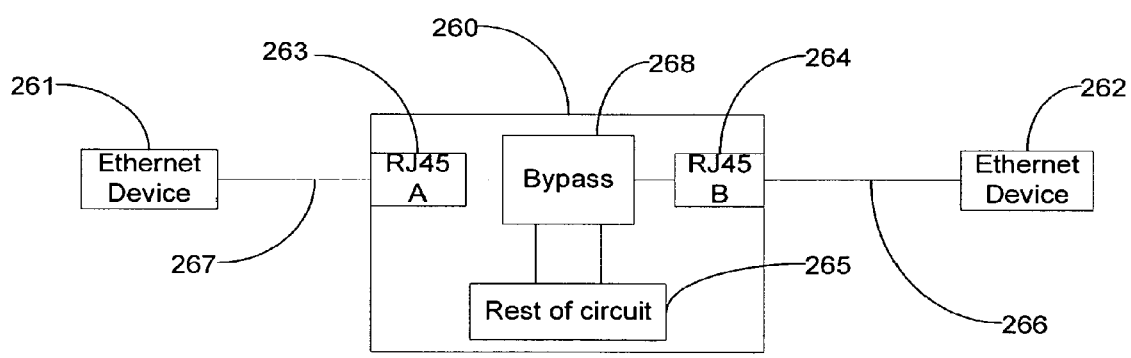
FIG. 24 is a block diagram of an ethernet device connected between two ethernet devices and providing a fail over bypass.

The device 260 of FIG. 24 implements an Ethernet fail over bypass mode, providing an electrical bypass between a pair of ports 263 and 264 under certain circumstances such as, but not limited to, power failure. In normal operation mode, the Ethernet connections are routed from either port 263 or 264 to the Rest of Circuit 265, which may be any type of device that uses at least two Ethernet ports, such as an Ethernet switch, a server, a relay, etc.

The Rest of Circuit 265 illustrated in FIG. 24 implements two Ethernet ports including Ethernet PHY circuits. In one example, these Ethernet PHY circuits implement an automatic MDI/MDIX function, which eases the installation by performing an automatic cross over function (IEEE 802.3 clause 40.4.4), without worrying about the type of cabling, i.e., with or without crossover.

Since the Rest of Circuit 265 of device 260 implements an automatic MDI/MDIX crossover function, the two external Ethernet devices 261 and 262 may be of any type. The cabling 266 and 267 between them and the device 260 may or may not have the cross over function. In bypass mode, the connection between the Ethernet device 261 on port A and the Ethernet device 262 on port B will fail if both devices are of the same type (i.e., both are MDI or MDIX), unless one of the devices implements an automatic MDI/MDIX crossover function or if the cable 266 or 267, but not both, is a cross over cable.

Implementing the two complementary mechanisms in device 260 assures that the bypass mode successfully enables the two Ethernet devices 261 and 262 to connect. Not having this feature may defeat the purpose of having a bypass mode since it is present to assure the connectivity, even in the case of a malfunctioning device 260, if the cross over is improper. The first mechanism is used to detect the incompatibility by implementing a detection algorithm. The second mechanism is used to correct, if required, the incompatibility.

Detection (While not in Bypass Mode)

Figure 25:
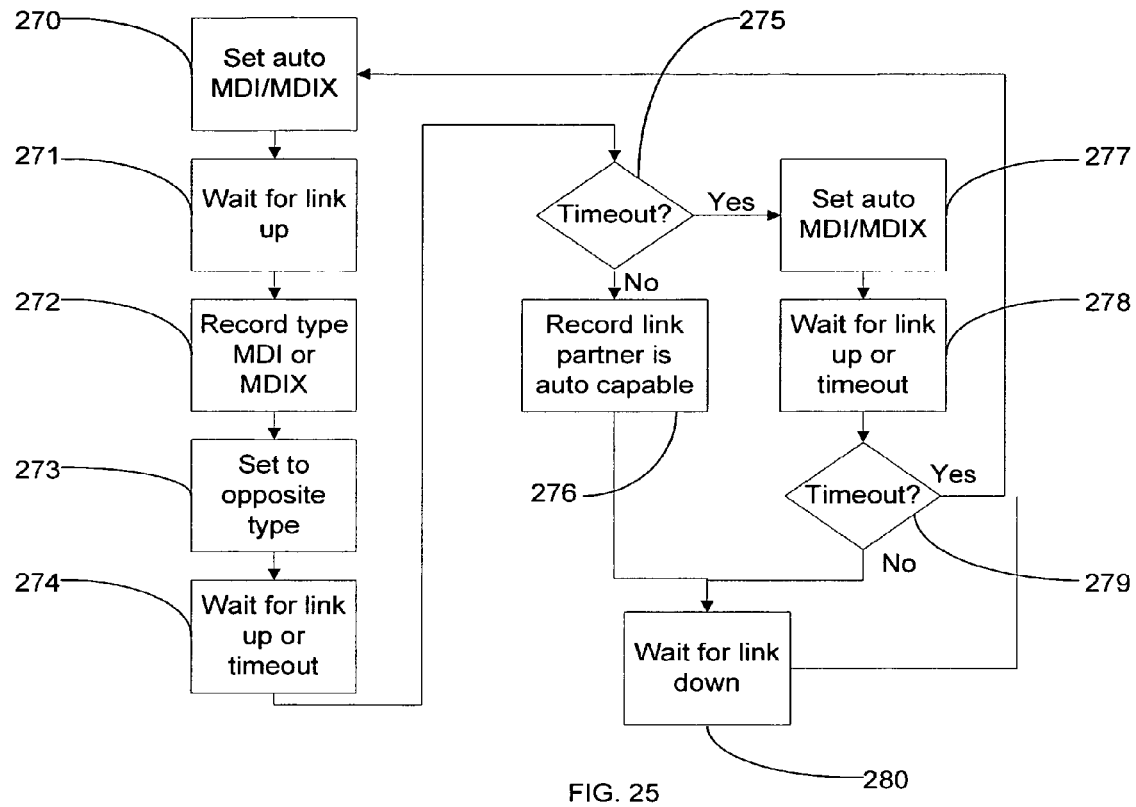
FIG. 25 is a flow chart of a routine executed by the device of FIG. 24.

In order to detect the incompatibility, the device 260 implements a link partner capability detection mechanism. Once the link partner capability of each link partner (261 and 262, one for each port) is determined, the two results are compared in order to detect the incompatibility. The routine illustrated by the flow chart of FIG. 25 includes the link partner capability detection mechanism, which is implemented independently of to each port. The routine illustrated in FIG. 25 includes the following stages:

Stage 270: The PHY is ser to enable its automatic MDI/MDIX capability.

Stage 271: The device waits for the link to get established.

Stage 272: It is assumed that the link partner uses a configuration opposite to the configuration (MDI or MDIX) used by the PHY. This configuration setting is recorded.

Stage 273: The PHY is set to disable its automatic MDI/MDIX capability and is set to use the same configuration stored in stage 272.

Stage 274: The device waits for a link to get re-established or until a timeout occurs. The timeout period is at least as long as the sample timer defined in IEEE 802.2 clause 40.4.5.2.

Stage 275: The outcome of stage 274 is tested.

Stage 276: If the link was established, without a timeout, the recorded value stored in stage 272 is changed to indicate that the link partner has the automatic MDI/MDIX capability.

Stage 277: A timeout occurred, the PHY is set to enable its automatic MDI/MDIX capability.

Stage 278: The device waits for the link to get re-established or until a timeout occurs. The same timeout period of Stage 274 is used.

Stage 279: The outcome of stage 278 is tested. If a timeout occurred, the next stage is stage 270.

Stage 280: The type of link partner is known (MDI, MDIX or automatic MDI/MDIX capable) and recorded (in stage 272 or 276). The device waits until the link is broken. When this occurs, the next stage will be stage 270.

Once both ports have a valid link established and once the type of link partner they have is known, i.e., both port's flow charts are at stage 270, the detection of incompatibility between the two link partners can be determined. The following table indicates the result of the detection mechanism based on the type of link partners detected:

|  | Link partner A | | |
| --- | --- | --- | --- |
| Link partner B | MDI | MDIX | Automatic MDI/MDIX |
| MDI | Incompatible | Compatible | Compatible |
| MDIX | Compatible | Incompatible | Compatible |
| Automatic MDI/MDIX | Compatible | Compatible | Compatible |

Once the result of the detection mechanism is known, it may be reported to an external agent, such as an SNMP trap monitor, or it can be queried by an external agent, such as an SNMP console, or made available by other means, such as a Web page, etc. Also, in case of incompatible link partners, the correction mechanism may be used.

Correction (While in Bypass Mode)

When in bypass mode, the direct connection between the link partners 261 and 262 connected to port A and port B of device 260 must implement a selectable crossover function. The selection is used to include or exclude a crossover in the path between the two Ethernet connectors 263 and 264 when the bypass mode is active. The correct selection of this crossover function is established by the detection mechanism when device 260 is not in bypass mode.

Figure 26:
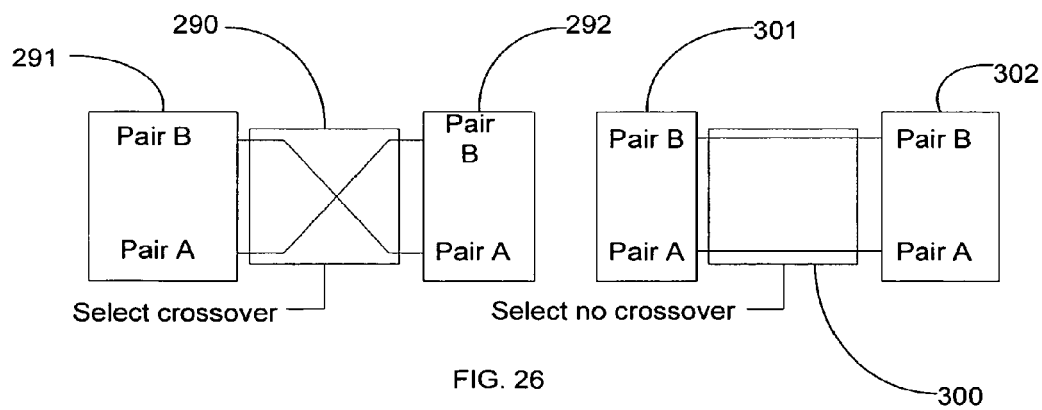
FIG. 26 is a pair of diagrammatic illustrations of two types of connections in the bypass circuit in FIG. 24.

In FIG. 26, a cross over path 290 and a straight path 300 are shown. They are part of the bypass circuit 268 of device 260. The complete bypass circuit 268 that connects the two Ethernet connectors 263 and 264 and the device's Ethernet PHY circuit (included in 265) is not shown.

Since it is necessary for the bypass mode to be valid even when no power is present, the crossover selection is valid even when such power is not present.

A number of methods may be used to implement the selectable cross over mode for the bypass 268 between the two Ethernet ports 263 and 264. Three examples for the selection of the cross over or straight paths are as follows:

1. The cross over vs. straight path selection for the bypass between the two Ethernet ports may be implemented by using mechanical switches that an operator will set to be in cross over mode or not, based on the detection done by the unit at the installation time.

2. The cross over vs. straight path selection for the bypass between the two Ethernet ports may be implemented by using jumpers that an operator will set to be in cross over mode or not, based on the detection done by the unit at the installation time.

3. The cross over vs. straight path selection for the bypass between the two Ethernet ports may be implemented by using two DPDT relays suitable for Ethernet operation. Using this approach, the device may select the correct setting based directly on the result of the detection of incompatibility.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method for determining compatibility between a first Ethernet link and a second Ethernet link respectively coupled through a first port and second port of an Ethernet device having a selectable MDI/MDIX crossover mode, said Ethernet device selectively providing an electrical bypass mode between said first and second ports, comprising determining whether the port pinout of the first Ethernet link is MDI or MDIX;

determining whether the port pinout of the second Ethernet link is MDI or MDIX;

determining whether at least one of the Ethernet links has automatic MDI/MDIX crossover functionality, determining whether the first and second Ethernet links are compatible, and when the first and second Ethernet links are not compatible, selecting said MDI/MDIX crossover mode of said Ethernet device when said Ethernet device is in said bypass mode.

2. The method of claim 1 further comprising reporting said compatibility to an external agent.

3. The method of claim 1 further comprising allowing said compatibility to be queried by an external agent.

4. The method of claim 1 further comprising:

enabling a crossover path or a straight path between said first and second ports, based on said compatibility.

5. The method of claim 1 further comprising:

configuring one or more mechanical switches to enable a crossover path or a straight path between said first and second ports, based on said compatibility.

6. The method of claim 1 further comprising:

configuring one or more jumpers to enable a crossover path or a straight path between said first and second ports, based on said compatibility.

7. The method of claim 1 further comprising:

enabling a crossover path or a straight path between said first and second ports, based on said compatibility, using two or more relays.

* * * * *